Sept. 30, 1958 R. RAYMOND 2,854,043

INSERT SAW ATTACHMENT TO ELIMINATE SPLINTERING

Filed May 13, 1957

INVENTOR.
RAY RAYMOND

BY Lothrop & West

ATTORNEYS

United States Patent Office 2,854,043
Patented Sept. 30, 1958

2,854,043

INSERT SAW ATTACHMENT TO ELIMINATE SPLINTERING

Ray Raymond, Sacramento, Calif.

Application May 13, 1957, Serial No. 658,851

3 Claims. (Cl. 143—157)

The invention relates to saw attachments, and, more particularly, to attachments capable substantially of eliminating splintering of the material being cut along the margins of the saw kerf.

The recent years have witnessed an ever-widening use of power-driven circular hand saws, particularly in applications involving the cutting of wood. While increasing enormously the productivity of a carpenter, or comparable user, such saws have heretofore caused considerable annoyance, and even rejection of materials cut by the saws, owing to their tendency to splinter the wood adjacent the margins of the saw kerf. Attempts have been made to circumvent this problem. The firm placement of a long thin piece of scrap wood over the line of the cut has been helpful in reducing splintering, but, since the wood scrap obscures the mark scribing the cutting line, such expedient is far from satisfactory. Transparent plastic pressure sensitive tape pressed down along and secured to the line to be cut has also been resorted to. Such tape is expensive, installation requires considerable time, and the tape is destroyed as the cut is completed.

It is therefore an object of the invention to provide a saw attachment which substantially eliminates any splintering which might otherwise result.

It is another object of the invention to provide a saw attachment which does not depend for its efficacy upon any make-shift expedients such as tape or wood cutting strips.

It is yet another object of the invention to provide a saw attachment which is re-usable thousands of times.

It is still another object of the invention to provide a saw attachment which is relatively inexpensive to make.

It is a further object of the invention to provide a saw attachment which is durable and long-lived and has substantially no moving parts to get out of order.

It is a yet further object of the invention to provide an attachment which is especially useful with power-driven circular hand saws.

It is still a further object of the invention to provide an attachment which is compatible with a great variety of commercially available power-driven circular hand saws.

It is yet another object of the invention to provide a saw attachment which does not interfere with the safe operation of the saw-blade guard customarily found on power driven hand saws.

It is still another object of the invention to provide a saw attachment which effectively obviates splintering in bevel positions as well as in straight cuts.

It is a further object of the invention to provide a saw attachment which in no way obscures the scribe mark indicating the line to be cut.

It is another object of the invention to provide a generally improved saw attachment.

Other objects, together with the foregoing, are attained in the embodiment described in the following description and shown in the accompanying drawing in which.

Figure 2:
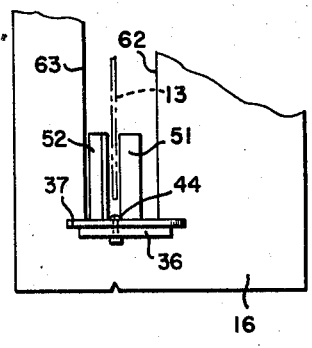
Figure 2 is a plan of the attachment mounted on the foot plate of a typical power-driven circular hand saw.
Figure 1:
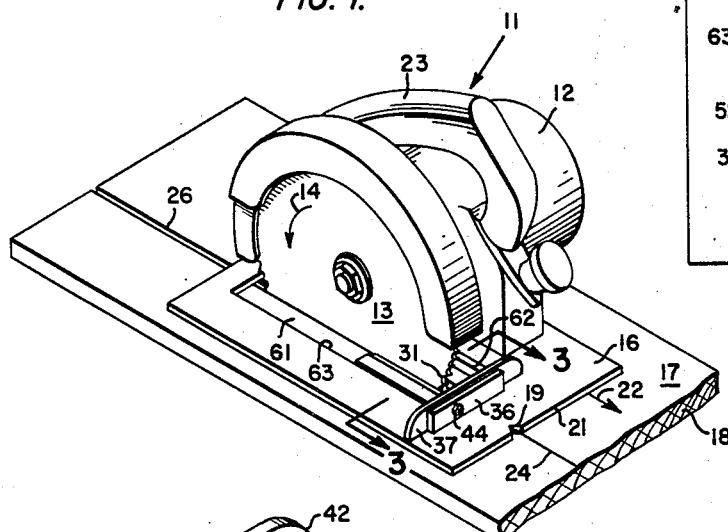
Figure 1 is a perspective showing the attachment in a typical environment.
Figure 5:
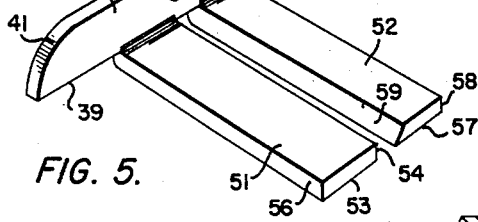
Figure 5 is a perspective of the saw attachment of the invention.

While the saw attachment of the invention is susceptible of numerous physical embodiments depending on the environment and the requirements of use, substantial numbers of the herein shown and described embodiments have been made and used and have performed in a highly satisfactory fashion.

The customary environment in which the attachment is found is a piece of equipment ordinarily known as a power-driven hand saw, designated generally by the numeral 11, the saw including an electric motor 12 rotating a circular saw blade 13 in the direction indicated by the arrow 14. The weight of the saw is borne by a foot plate 16 supported by the upper surface 17 of the material 18 being cut. A V-shaped notch 19 in the leading edge 21 of the foot plate 16 is aligned with the plane of the saw blade 13 and, consequently, is used as a cutting guide, the saw being urged along in the direction of the arrow 22 by an operator grasping and pushing on a handle 23 in a fashion such that the notch 19 at all times substantially straddles a scribe mark 24, or cutting line, previously imposed on the material. A saw kerf 26 trails from the blade and defines the boundary of the piece of material being cut.

Since the blade rotates in the direction indicated by the arrow 14, the teeth adjacent the leading edge 31 of the blade swing upwardly through the material being cut. Consequently, a great many of the fibers adjacent the upwardly moving teeth are broken or torn loose, giving rise to splinters. Splintering does not occur on the lower surface of the material to any extent since the teeth enter the material from below; on the upper surface, however, where the teeth leave the material, the fibers adjacent the surface are urged upwardly by the teeth and are bent. Considering the fibers as minute beams, the bending limit of many of the fibers is exceeded and rupture occurs. Splintering is not particularly consequential if rough cuts are permissible. Where, on the other hand, a finished appearance is desired, such as in cabinet work or shortening a door, excessive splintering can render the piece useless.

It has been found that if the fibers, again considered as small beams, are prevented from being bent or strained in excess of their elastic limit, splintering can, for all intents and purposes, be eliminated. If, in other words, the fibers adjacent the saw teeth leaving the upper surface of the material can be restrained or maintained in their original orientation and attitude, the saw teeth effect a clean shearing of the fibers.

The saw attachment of the invention performs such a restraining function and effects this desirable result in an efficient way.

Detchably mounted on a vertical transverse flange 36 secured to the foot plate 16 is a mounting plate 37. The mounting plate 37 is elongated in a transverse direction and includes an upper edge 38, a planar lower edge 39 and, preferably, a pair of arcuate or rounded ends 41 and 42. An elongated slot 43 pierces the central portion of the plate and serves in conjunction with a fore and aft fastening 44 to secure the plate 37 to the flange 36 regardless of the angularity of the foot plate 16 with respect to the plane of the saw blade 13. It is especially to be noted, in this connection, that the axis of the fastening 44 is at all times congruent or coincident with the vertical median plane 46 of the saw blade 13, regardless of the bevel angle.

Mounted on the bottom edge 39 of the transverse mounting plate 37 and extending normally with respect to the plate is a first runner 51 and a second runner 52. The first runner 51 includes a horizontal planar bottom surface 53, a vertical inner edge 54 and a vertical outer edge 56. The second runner 52, on the other hand, while having a horizontal bottom surface 57, co-planar with the bottom surface 53, and a vertical outer edge 58, includes a beveled or inclined inner edge 59, causing the section of the second runner 52 to assume the shape of a shallow truncated right triangle. In the ordinary case, the slope of the beveled edge 59 is forty-five degrees. The runners, being vertically displaced below the bottom edge 39 of the mounting plate 37, are disposed in the elongated opening 61 ordinarily encountered in the foot plates of power-driven circular hand saws. The opening 61 usually extends for a considerable distance along the foot plate 16 and, in the saw equipment shown herein, the opening is bounded laterally by a pair of side walls 62 and 63, the side walls 62 and 63 serving as limit stops to the adjacent edges 56 and 58, respectively, of the runners 51 and 52, the lateral extremes of placement of the runners being thereby defined. Regardless of runner position, a pair of shoulders 66 and 67 on the plate 37 overlaps the foot plate 16.

Figure 3:
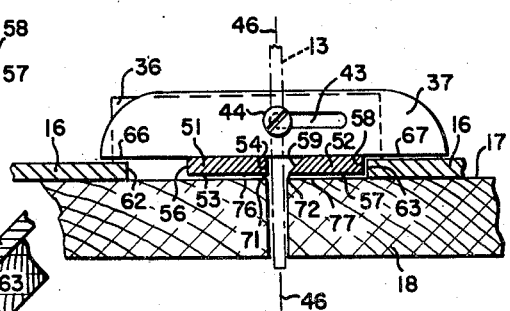
Figure 3 is a transverse section on line 3—3 of Figure 1 of the attachment shown mounted on a saw making a straight or vertical cut in a piece of material.

Where, as appears most clearly in Figure 3, a straight or vertical cut is to be made in the material 18, the mounting plate is located at its extreme right-hand position, the fastening 44 being at the left-hand end of the slot 43 and the edge 58 of the beveled runner 52 being in abutment with the adjacent side wall 63 of the foot plate opening 61. It will be noted that with the attachment in the location just described, the lower inner corner 71 of the runner 51 and the lower inner corner 72 or tip of the beveled runner 52 almost but not quite touch the opposite sides of the saw blade 13. In addition, the lower surfaces 53 and 57, respectively, of the two runners bear against or engage with the subjacent upper surfaces 76 and 77, respectively, of the material 18 being cut. Thus, while Figure 3 shows, for purposes of clarity, a space between the bottom of the runners and the top of the material, it is highly important to understand that in fact the runners press down on the underlying fibers throughout the entire transverse distance between the lower inner corners of the runners and the lower outer corners thereof. Indeed, it is the downward urgency of the runners against the subjacent fibers, as well as the close juxtaposition between the blade and the runner corners, which gives a smooth, shearing type of cut by the saw blade. The individual fibers, in other words, are held rigidly so that as the cutting teeth sweep across them, a clean cross-cut, or shear, is effected. There is no tearing, no bending and breaking of the fibers; there is no splintering.

Figure 4:
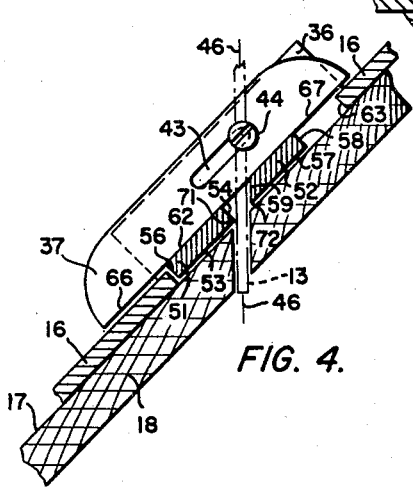
Figure 4 is a view comparable to that of Figure 3, but with the saw making a bevel cut.

Figure 4 illustrates the placement of the parts in extreme bevel attitude. The fastening 44 having previously been loosened, the saw attachment is moved laterally so that the outer edge 56 of the runner 51 abuts the wall 62 of the foot plate opening, the fastening 44 concurrently occupying a position at the right-hand end of the slot 43. Upon tightening the fastening 44, cutting can be undertaken. It can be seen by reference to Figure 4 that even in extreme bevel position, the runner corners 71 and 72 closely straddle the saw blade 13 and thus provide a stout holding down effort on the fibers adjacent the blade. In attitudes intermediate the straight cut and the full bevel, a comparable fiber restraining effort is exerted and an eminently satisfactory, smooth cut is obtained.

It can therefore be seen that I have provided a compact, economical saw attachment which is highly effective in accomplishing its purposes, the most important of which is the rendering of a clean, smooth cut.

I claim:

1. A portable power saw attachment including a mounting plate adapted to straddle in transverse position the longitudinal opening in the footplate of the saw and to be secured to said footplate and a pair of spaced parallel flat runners extending longitudinally from the bottom edge of said plate and adapted to straddle the saw blade when placed in said opening, the transverse distance between the opposite outer edges of said runners being less than the transverse width of said opening, the inner edge of one of said runners being normal to the lower surfaces of said runners, the inner edge of the other of said runners being at a 45 degree angle thereto.

2. A pair of parallel flat runners spaced apart a distanace slightly in excess of the thickness of a saw blade used in a circular hand saw having a footplate with an opening in it through which the blade passes, said runners having co-planar bottom surfaces, and a mounting plate mounted transversely on one end of said runners on the upper surfaces thereof, said plate projecting laterally beyond the margins of said runners and provided with means for attachment to the saw footplate with said runners disposed within the opening in said footplate.

3. An attachment for insertion in the longitudinal opening in the footplate of a power saw having a saw blade disposed in the opening, said attachment including a transverse mounting plate extending across and above one end of said opening and being detachably mounted on said footplate, and a pair of parallel flat runners mounted on said mounting plate and extending toward and straddling the saw blade, thee bottom surfaces of said runners being co-planar with the bottom surface of the footplate, the opposite outer edges of said pair of runners being spaced apart a distance less than the transverse width of the opening whereby said pair of runners is transversely shiftable in said opening as the footplate is angularly relocated relative to the plane of the saw blade.

References Cited in the file of this patent

UNITED STATES PATENTS

| | | |
|---|---|---|
| 461,325 | Deniston | Oct. 13, 1891 |
| 1,183,383 | Jenkins | May 16, 1916 |
| 1,262,601 | Royal et al. | Apr. 9, 1918 |
| 1,922,151 | Boice et al. | Aug. 15, 1933 |
| 2,381,489 | Dietz | Aug. 7, 1945 |
| 2,623,557 | Kendall | Dec. 30, 1952 |